Aug. 4, 1959         A. E. BURCH         2,898,125
HITCH FOR AN AGRICULTURAL TOOL
Filed March 7, 1957                    2 Sheets-Sheet 1

INVENTOR.
ARCHIE E. BURCH
BY Alexander Riaboff
ATTORNEY

Aug. 4, 1959
A. E. BURCH
2,898,125
HITCH FOR AN AGRICULTURAL TOOL
Filed March 7, 1957
2 Sheets-Sheet 2
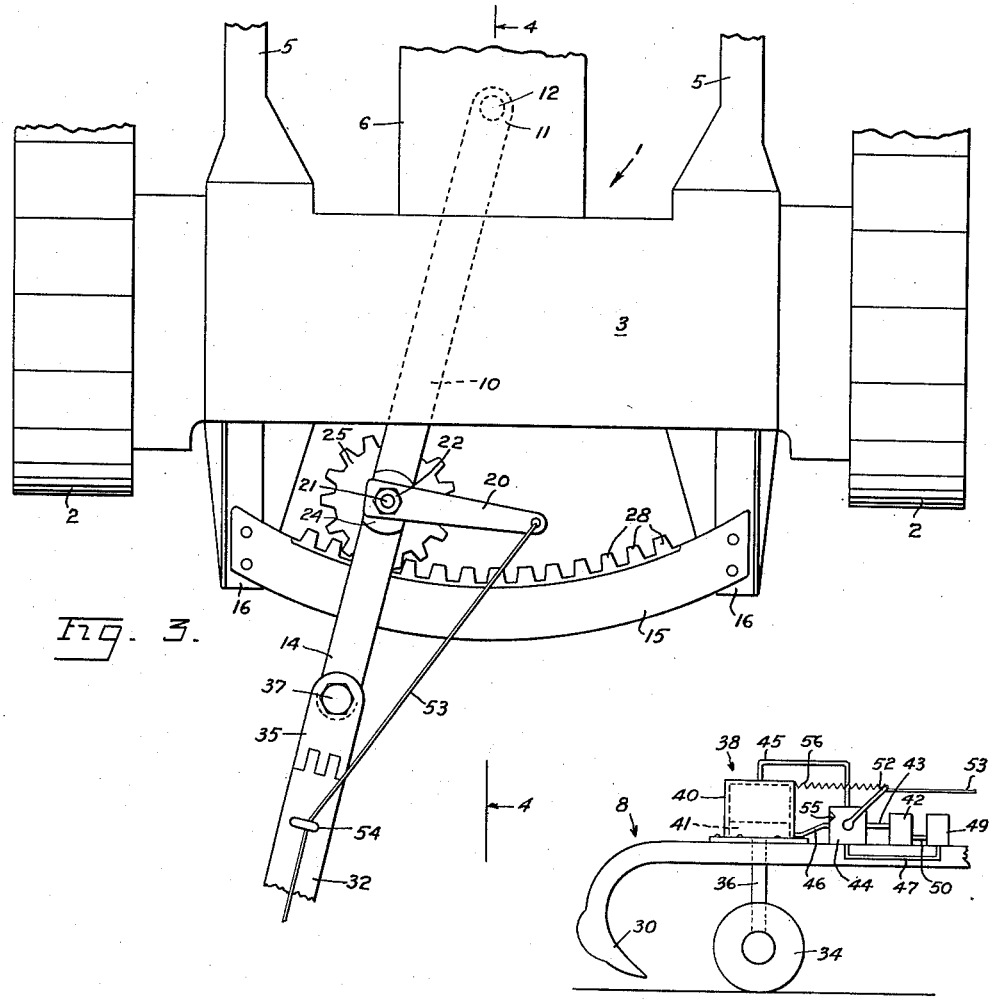
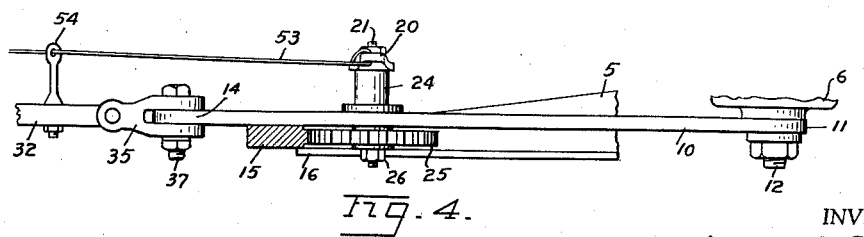
INVENTOR.
ARCHIE E. BURCH
BY Alexander Riaboff
ATTORNEY

United States Patent Office 2,898,125
Patented Aug. 4, 1959

2,898,125

HITCH FOR AN AGRICULTURAL TOOL

Archie E. Burch, Williams, Calif.

Application March 7, 1957, Serial No. 644,529

7 Claims. (Cl. 280—447)

This invention relates to a hitch for an agricultural tool.

The primary object of this invention is to provide a hitch connecting a tractor with an agricultural tool, which hitch is adapted to operate automatically a mechanism carried by said tool when the tractor changes the direction of its travel, such as a mechanism for lifting a plow, or disks, out of the ground, or opening or closing a dispensing mechanism, or the like.

Another object of this invention is to provide a hitch of the type described which consists of a draw bar having a lever pivotally carried thereby and operated by the movement of the draw bar whenever the tractor changes its course, said lever being connected with a mechanism on the agricultural tool drawn by said tractor for operating said mechanism.

Other objects and advantages will appear as the specification proceeds and the novel features of the device will be particularly pointed out in the claims hereto annexed.

In this specification and the annexed drawing the invention is illustrated in the form considered to be the best but it is understood, that the invention is not limited to such form; and it is also to be understood that in and by the claims following the description, it is desired to cover the invention in whatsoever form it may be embodied.

This invention is illustrated in the accompanying drawings in which:

Fig. 3 is a diagrammatic plan view of the rear end of a tractor showing the hitch in an operative position.

Fig. 4 is a side view of the hitch taken along the line 4—4 of Fig. 3; and

Fig. 5 is a diagrammatic illustration of said hitch operating a mechanism on said agricultural tool.

Figure 1:
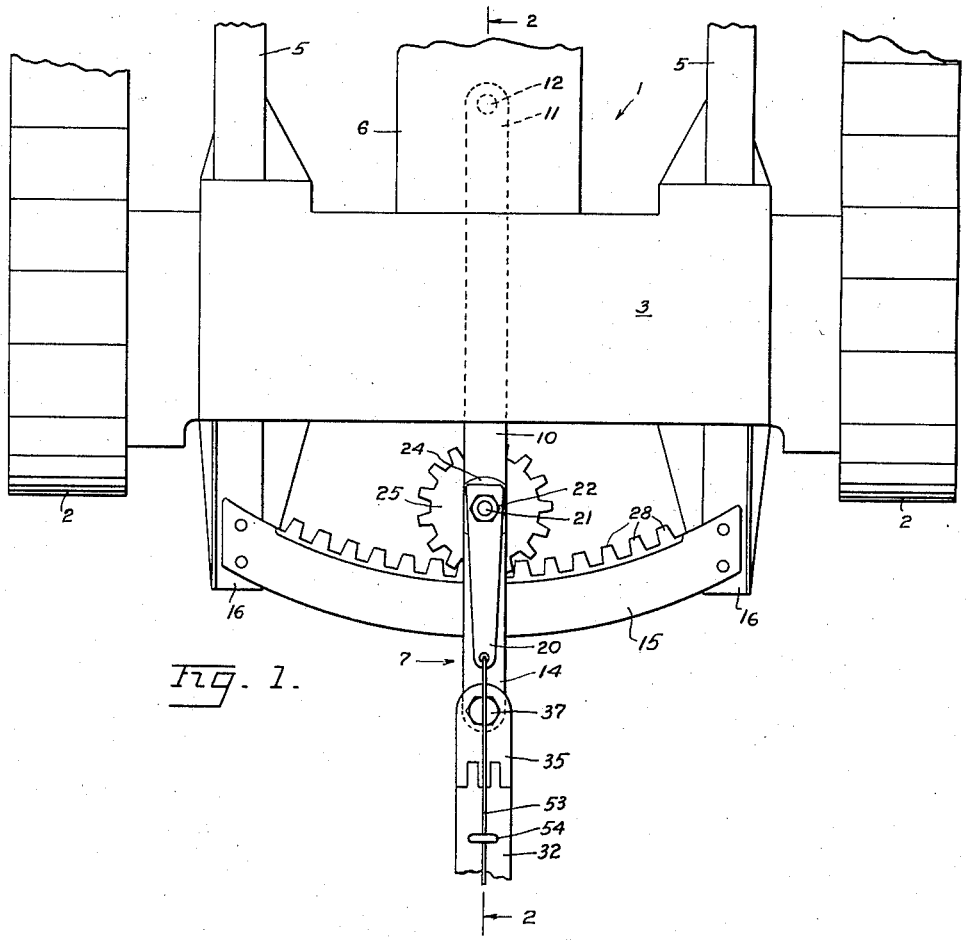
Fig. 1 is a diagrammatic plan view of the rear end of a tractor showing the hitch in normal position.

In detail, Fig. 1 shows a rear end of a conventional tractor 1, having a pair of caterpillar tracks 2, driven by a differential 3, the latter being secured to and supported by a tractor frame 5. Integral with said differential 3 is a transmission 6 extending forwardly and centrally from said differential. A hitch 7 connects said tractor 1 with an agriculutral tool, such as a plow 8. The hitch 7 consists of a conventional draw bar 10 pivoted at its end 11 to the bottom of said transmission 6, or other part of the power plant, or the frame by a pivot 12. The bar 10 is free to swing about the pivot 12 and extends rearwardly beyond the frame 5. The free end 14 of the bar 10 is slidably supported on an arch 15 the center of which is the pivot 12. The arch 15 is secured to the rear ends 16 of the frame 5 by rivets or the like. The draw bar 10 rotatably carries a lever 20. The latter is affixed to a shaft 21 by a nut 22, which shaft passes through a bearing 24 secured to the top side of said bar 10, and through the latter, and carries on its lower end a gear 25. A nut 26 locks the gear 25 to said shaft.

The arch 15 is provided with teeth 28 on the inner periphery thereof, which teeth mesh with the gear 25. The teeth 28 may be formed on said arch, or on a separate auxiliary arch and the latter may be secured on said arch 15.

When the tractor 1 is moving directly forward, the draw bar 10 occupies a position substantially parallel to the tractor frame 5, as shown in Fig. 1, and the lever 20 is also in a position wherein the longitudinal axes of said lever and said bar are substantially parallel.

When, however, the tractor 1 changes the direction of its travel, the draw bar 10 swings to one side, or another, depending on the direction of its travel, as shown in Fig. 3, and forces the gear 25 to travel along the teeth 28, thus causing said gear to rotate. The rotation of the gear 25 swings the lever 20. The size of the gear 25 is so selected that the lever 20 swings through an angle at least three times greater than the angle of swinging of the draw bar 10. This arrangement makes the lever 20 to respond to the swinging of the draw bar 10 quickly and through a considerable angle and thus provides a sensitive means for operating a mechanism on the agricultural tool 8 at the beginning of the tractor's turn.

The agricultural tool 8 may be of any kind, and is diagrammatically shown in the drawings as a plow having a blade 30 secured to the end of a beam 32, which is supported by wheels 34. The beam 32 carries a universal joint 35 on its free end. The latter is secured to the drawing bar 10 by a pin 37. The tool 8 is shown as having a hydraulic mechanism 38 for raising and lowering the plow blade 30. It is to be understood that said agricultural tool and said mechanism are shown only for the purpose of illustration, and the same may be of any kind, shape, size and purpose and we do not wish to limit the hitch, which is the subject matter of this patent application, to the particular use shown in these drawings, as said hitch may be used with any agricultural tool or implement.

The hydraulic mechanism 38 includes a cylinder 40 having a piston 41 therein adapted to be moved downwardly by oil pumped thereinto by a pump 42. The piston 41 is connected with the wheels 34 by a shaft 36. A pipe 43 connects said pump with a control four way valve 44 which in turn is connected by a pipe 45 with the top of said cylinder 40, a pipe 46 with the bottom end of said cylinder and a pipe 47 with a storage oil tank 49, which is also connected with the pump 42 by a pipe 50.

Figure 2:
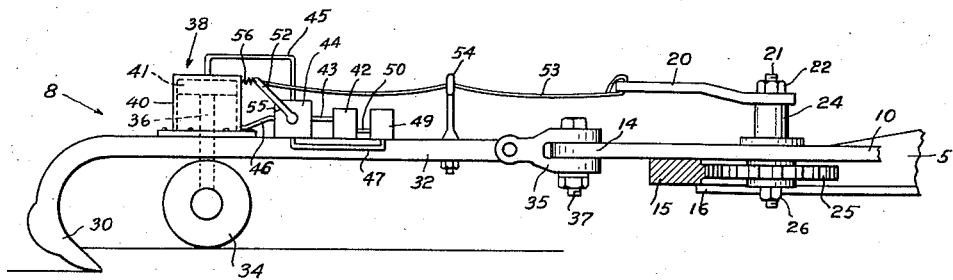
Fig. 2 is a side view of the hitch taken along the line 2—2 of Fig. 1 and of an agricultural tool drawn thereby.

The valve 44 has a handle 52 connected by a cable 53, or the like, with said lever 20. Fig. 2 shows said lever 20 and said cable 53 in their normal position, said cable loosely hanging between said lever and the handle 52. The cable 53 is preferably supported by a support 54 secured to the beam 32. By having said cable 53 loosely hanging, as above said, small deviations by the tractor from its path will not operate the valve 44, as the motion of the lever 20 will be spent on tightening the cable. Only considerable turns of the tractor will operate said valve.

When handle 52 is in the position, shown in Fig. 2, it abuts a stop 55 formed on the valve and is held thereagainst by a spring 56, one end of which is secured to said handle and the other to said cylinder 40. The valve 44 connects the pipe 45 with the pipe 46, permitting oil, from the upper part of the cylinder 40 to pass in the lower part, thus permitting the piston 41 to move upwardly. The oil from the pump 42 passes through the pipe 46 into the valve 44, through the pipe 47 into the storage tank 49.

When the lever 20 through the cable 53 turns the handle 52 into a position shown in Fig. 5, the oil from the pump 42 passes through the pipe 43, valve 44, pipe 45 into the top of the cylinder 40, thus forcing the piston 41 downwardly and forcing the oil in the lower part of said cylinder into the pipe 46, valve 44, pipe 47, into the storage tank 49. The downward movement of the piston 41 raises the plow upwardly and pulls the plow blade 30 out of the ground. As soon as the turn is completed and the draw bar 10 and the lever 20 take their normal position, the spring 56 pulls the handle 52 in its normal position, shown in Fig. 2, and the piston 41 raises to the top of the cylinder 40, thus lowering the plow blade 30 into the ground.

I claim:

1. A hitch for drawing an agricultural tool by a tractor carrying a mechanism to be automatically operated whenever the latter changes the direction of its travel, said hitch comprising a draw bar, one end of which is pivotally connected to the tractor, and the other end to the agricultural tool, an arch carried by the rear end of said tractor, said arch slidably supporting the other end of said draw bar, a lever carried by said draw bar, means on said arch and on said draw bar for swinging said lever in relation to said bar whenever said draw bar swings in relation to said arch, said lever being operatively connected with the said mechanism.

2. A hitch for connecting a tractor to an agricultural tool carrying a mechanism to be automatically operated whenever the latter changes the direction of its travel, said hitch comprising a draw bar, one end of which is pivotally connected to said tractor and the second end to the agricultural tool, an arch affixed to the rear end of said tractor for slidably supporting the second end of said draw bar, a lever carried by said draw bar, a gear attached to said lever, a plurality of teeth on said arch meshing with said gear for rotating said gear and said lever whenever said draw bar swings in relation to said arch, said lever being operatively connected with said mechanism.

3. A hitch for connecting a tractor with an agricultural tool carrying a mechanism to be automatically operated whenever the latter changes the direction of its travel, said hitch comprising a draw bar one end of which is pivotally connected to said tractor and the second end to the agricultural tool, an arch affixed to the rear end of said tractor for slidably supporting the second end of said draw bar, a lever carried by said draw bar, a gear attached to said lever, a plurality of teeth on said arch, said teeth meshing with said gear for rotating the latter and the lever whenever said draw bar swings in relation to said arch, said lever being operatively connected with said mechanism.

4. A hitch for drawing an agricultural tool by a tractor carrying a mechanism to be automatically operated whenever the latter changes the direction of its travel, said hitch comprising a draw bar one end of which is pivotally connected to the tractor, and the other end to the agricultural tool, an arch carried by the rear end of said tractor, said arch slidably supporting the other end of said draw bar, a lever carried by said draw bar, means on said arch and on said draw bar for swinging said lever in relation to said bar, whenever said draw bar swings in relation to said arch, the angle of swinging of said lever in relation to the bar being at least twice greater than the angle of swinging of the bar in relation to the arch, said lever being operatively connected with said mechanism.

5. A hitch for connecting a tractor with an agricultural tool carrying a mechanism to be automatically operated whenever the latter changes the direction of its travel, said hitch comprising a draw bar, one end of which is pivotally connected to said tractor and the second end to the agricultural tool, an arch affixed to the rear end of said tractor for slidably supporting the second end of said draw bar, a lever carried by said draw bar and normally occupying a neutral position wherein the central longitudinal axis of said lever and bar are parallel; a gear attached to said lever for rotating therewith, a plurality of teeth arranged on said arch and meshing with said gear for rotating the latter whenever said draw bar swings from its neutral position, the angle of rotating of said lever in relation to said bar being at least twice greater than the angle of swinging of the bar in relation to said arch; said lever being secured to said gear and operatively connected with said mechanism for operating the latter whenever the tractor by changing the path of its travel swings the draw bar in relation to the arch.

6. A hitch for connecting a tractor with an agricultural tool carrying a mechanism to be automatically operated whenever the latter changes the direction of its travel, said hitch comprising a draw bar, one end of which is pivotally connected to said tractor and the second end to the agricultural tool, an arch affixed to the rear end of said tractor for slidably supporting the second end of said draw bar, a plurality of teeth on said arch, a shaft rotatably carried by said bar, a lever secured to one end of said shaft, a gear secured to the other end of said shaft and meshing with said teeth, said gear being rotatable by swinging motion of said bar in relation to said arch, said lever being operatively connected with the mechanism for operating the same whenever said tractor changes the direction of its travel.

7. A hitch for connecting a tractor with an agricultural tool carrying a mechanism to be automatically operated whenever the latter changes the direction of its travel, said hitch comprising a draw bar, one end of which is pivotally connected to said tractor and the second end to the agricultural tool with freedom of swinging about their pivots; an arch affixed to the rear end of said tractor for slidably supporting the second end of said draw bar, a lever carried by said draw bar above the same and normally occupying a neutral position wherein the central longitudinal axis of said lever and bar are parallel; a gear attached to the lower side of said lever for rotating therewith, a plurality of teeth arranged on said arch and meshing with said gear for rotating the latter whenever said draw bar swings from its neutral position, the angle of rotating of said lever in relation to said bar being at least twice greater than the angle of swinging of the bar in relation to said arch, a shaft passing through said draw bar and rotatably supported therein, said shaft having said gear secured to the lower end thereof and said lever secured to the upper end thereof, said lever being operatively connected with said mechanism for operating the latter whenever the tractor by changing the path of its travel swings the draw bar in relation to the arch.

References Cited in the file of this patent

UNITED STATES PATENTS

| | | |
|---|---|---|
| 1,413,728 | Hansmann | Apr. 25, 1922 |
| 1,422,186 | Davis | July 11, 1922 |
| 1,477,345 | Hagadone | Dec. 11, 1923 |
| 1,797,897 | Campbell | Mar. 24, 1931 |